A. O. ABBOTT, Jr.
AUTOMATIC GLASS BLOWING MACHINE.
APPLICATION FILED APR. 24, 1912.

1,116,340.

Patented Nov. 3, 1914.
7 SHEETS—SHEET 3.

Fig. 3.

WITNESSES

INVENTOR
Adrian O. Abbott Jr.
Knight Bros
Attorneys

A. O. ABBOTT, Jr.
AUTOMATIC GLASS BLOWING MACHINE.
APPLICATION FILED APR. 24, 1912.

1,116,340.

Patented Nov. 3, 1914.
7 SHEETS—SHEET 7.

WITNESSES

INVENTOR
Adrian O. Abbott Jr.
By Knight Bros.
Attorneys

UNITED STATES PATENT OFFICE.

ADRIAN O. ABBOTT, JR., OF TOLEDO, OHIO.

AUTOMATIC GLASS-BLOWING MACHINE.

1,116,340.　　　　Specification of Letters Patent.　　Patented Nov. 3, 1914.

Application filed April 24, 1912. Serial No. 692,901.

*To all whom it may concern:*

Be it known that I, ADRIAN O. ABBOTT, Jr., a citizen of the United States, residing at Toledo, in the county of Lucas and State of Ohio, have invented certain new and useful Improvements in Automatic Glass-Blowing Machines, of which the following is a specification.

This machine is designed for blowing bottles, globes, bulbs, jars, etc., of all sizes.

My device is illustrated in the accompanying drawings, where,

Fig. 5 a vertical cross section and part elevation of a blow head and gears; Fig. 5$^a$, a side elevation of the blow head plate and guide in larger scale.

Figure 1:
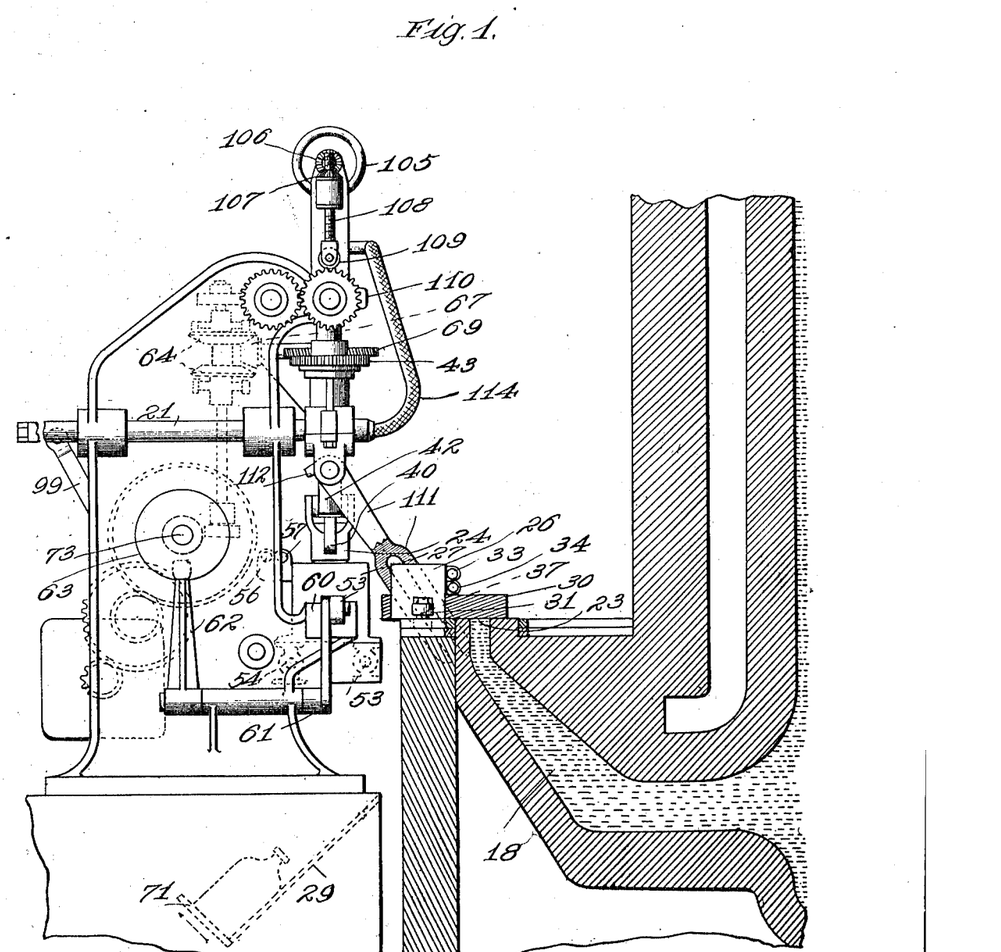
Figure 1 represents a side elevation of a glass blowing machine.

The glass pot shown in Fig. 1 is a receiving pot taking glass from a melting pot as the glass is used. The height of glass in the receiving pot is depended upon to force the glass into the blanking mold and as it is taken from near the bottom of the pot, the best glass is obtained. This machine handles a variety of sizes not possible in any other machine, and the machine is also much smaller than any machine having half the capacity; the number of blowing heads not being limited to the number shown in the drawings.

The construction and operation of the device will now be described (see particularly Figs. 1 to 5). The blow head 19 is mounted in a bearing frame or sleeve 20 (Figs. 2 and 5) and the whole suspended upon reciprocating guides 21, 22, which carry a number of these heads and move each from the position shown in full lines, over the tank picking up a blanking mold on the way and moving it over the opening 23 where the glass is forced into the blanking mold 26 forming the blank which is sheared between the edges of the mold and the opening 23, when the mold travels back with the head. The mold opens and the blank is carried into the finishing molds by the jaws 24, 25, on the head which hangs above the blank. The finishing mold 27 is closed upon the blank, the air turned on and the blank expanded to the shape of the finishing mold. Thereupon the mold opens, the bottom plate 28, Fig. 5, falls away, the jaws then open and drop the article as shown, into a trough 29, Fig. 1, the jaws 24 and 25 constituting a common head for the blanking and the finishing molds.

Figures 5, 5A:
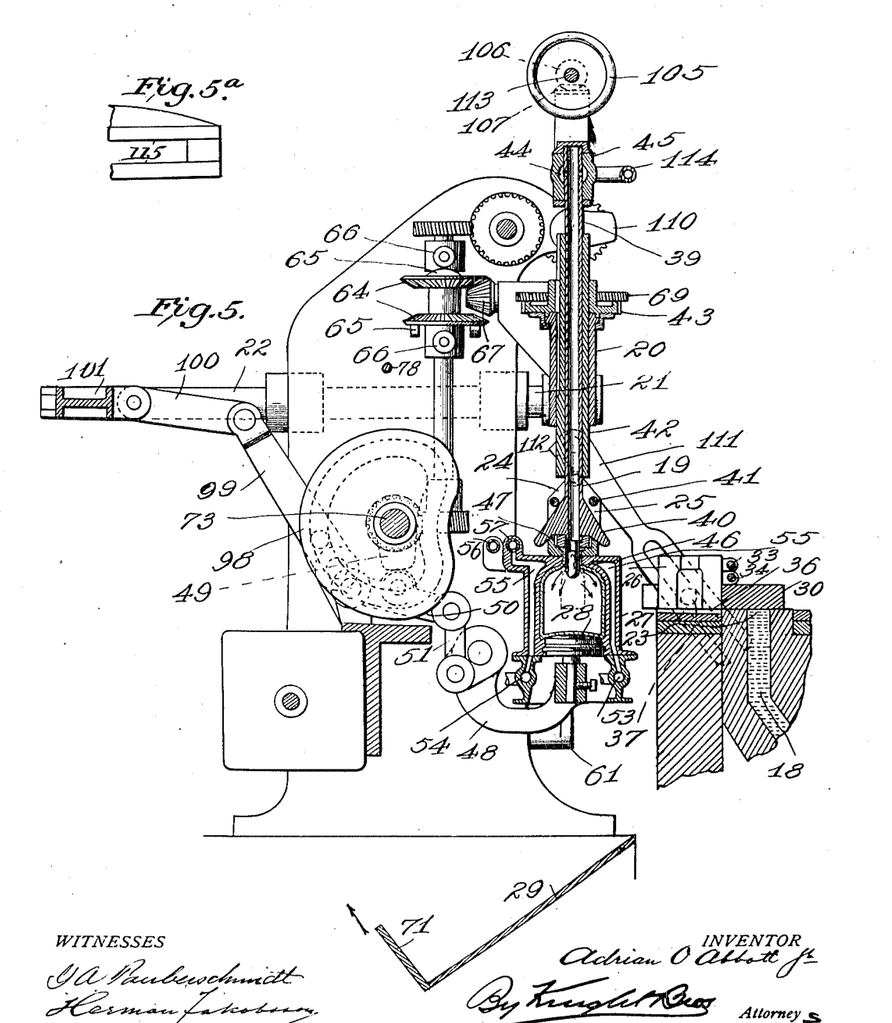
Figure 6:
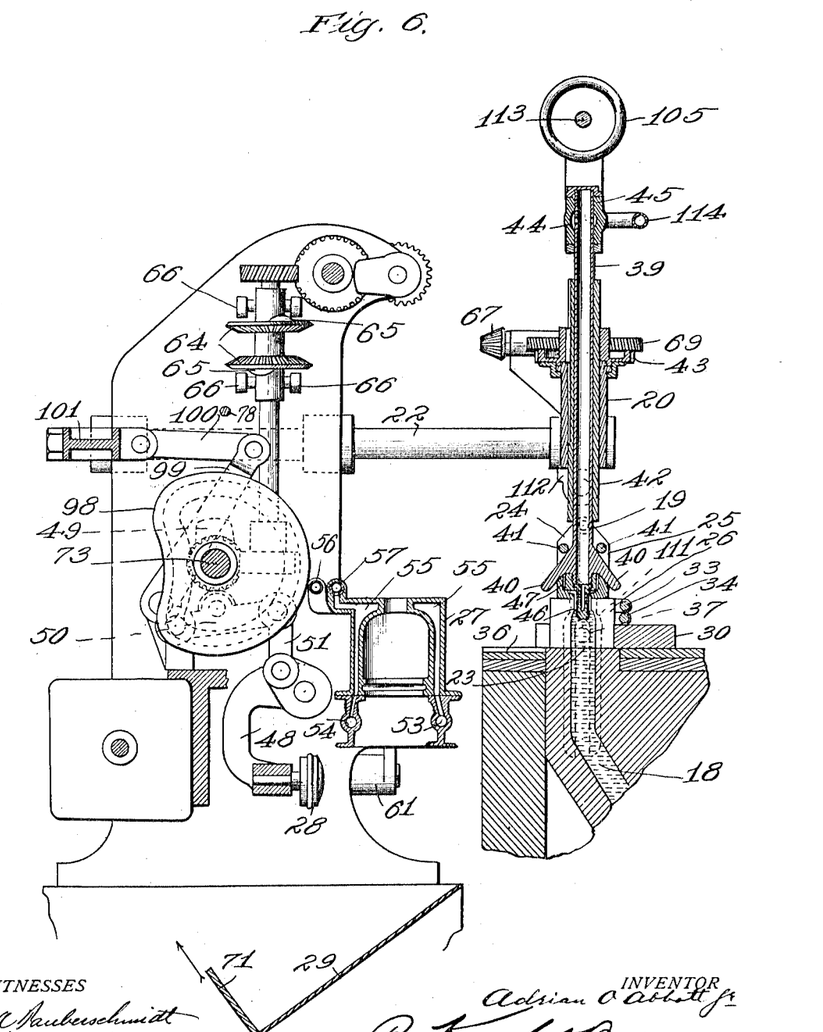
Fig. 6 a vertical section of a part of the furnace pot.
Figure 7:
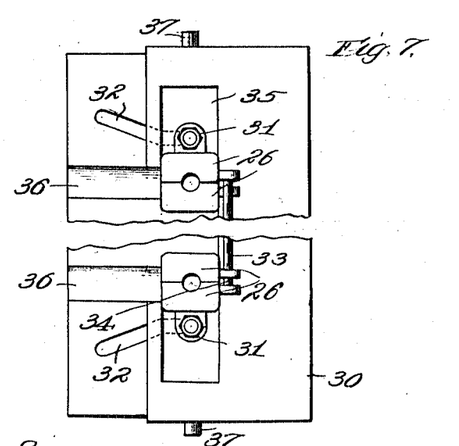
Fig. 7 a plan view of the blanking molds.

The conduit 18, Figs. 1 and 6, projects from the body of the pot near the bottom and terminates in a series of openings 23, through which the glass enters at the bottom of the blanking molds 26, Figs. 7 and 6, when they are in such a position that their openings register with those of the conduit. In Fig. 7, the blanking molds 26 are shown closed over the furnace openings and in Fig. 3 open and shifted to one side. By moving the plate 30 to the left, the molds are carried along, shearing the glass between the bottom of the mold and the furnace top, and as they proceed, the rollers 31 on the end molds engage the slots 32 pulling the molds open by means of the connecting rods 33 and 34. The outer halves of the end molds are guided in the plate 30 by the opening 35, the front wall of which is cut away sufficiently to permit the horizontal transfer of the blanks from the blanking molds to the finishing molds. The plate 30 covers the openings, preventing escape of glass when molds are not over same, see Fig. 1. The top of the furnace shelf is cut away at 36 to prevent blanks dragging along when they leave the molds. The plate 30 is held in suitable guides 115 and together with the molds is operated by pins 37 and levers 111 and the whole (molds and plate) is counter-weighed so it will automatically assume a position with the plate over the openings when not acted upon to the contrary. The plate-guides 115 and counter-weights 116 are shown in Fig. 5$^a$ where links 118 connect the pins 37 with the levers 117, which are rigidly attached to the oscillating counter-weights.

In Fig. 5 is shown a cross section of blowing head 19, one half of a finishing mold 27 with bottom plate 28 and operating mechanism for said plate in position for blowing. The jaws 24 and 25 serve to support the blank in transfer from the blanking mold to the finishing mold, and also for shaping the neck on the article. The jaws have a hinge 38 and upon the hollow sleeve or blow pipe 39 being raised, the projections 40 on the lower part of the head strike rods 41 and open the jaws. The hinge 38 is situated on a sleeve 42, which may be revolved by a gear 43, but is not reciprocated except in adjusting. The air enters from a hose 114 at the ports 44 in the crosshead 45 and proceeds as indicated by the arrows through the openings in the nozzle 46, which communicates with a space between the nozzle 46 and its securing thimble 47 and passes into the blank as shown by the arrows. The thimble 47 is shaped to conform with the interior of the neck of the bottle and the nozzle 46 serves as a plug to keep glass from entering the blow pipe or sleeve 39, and when the blanking mold is filling, it allows some air to escape between nozzle 46 and thimble 47 into blow pipe 39. The end of this nozzle or plug 46 is shaped to form a starting point in the blank, which will give the best results in distribution of glass in blowing. The outline of a blown bottle is shown in heavy line with the shape of the blank before blowing in dotted lines in center. The bottles or other articles being formed, the molds open, the bottom plates 28 are swung by two arms 48 through the movement of cam 49, cam lever 50 and push rod 51 into position shown in Fig. 6; the blow pipe 39 is then raised and presses upon rods 41, thereby opening the jaws and dropping the articles out of the machine. The blow pipe 39 then drops, closing the jaws and proceeds to perform the blanking operation, while at the same time the plates 28 are raised and, upon the return of the heads with the blanks, the finishing molds close around these plates being centered by them and locked by the tongue and groove 54. The bottom plates 28 are inserted in a long casting running from end to end of the machine between the arms 48.

53 and 54, see Fig. 5, are the supports for the finishing molds, which supports also serve as conductors for a fluid medium used for regulating the temperature of the molds. For this reason the finishing molds are provided with ducts 55 terminating in the outlets 56 and 57.

Figure 2:
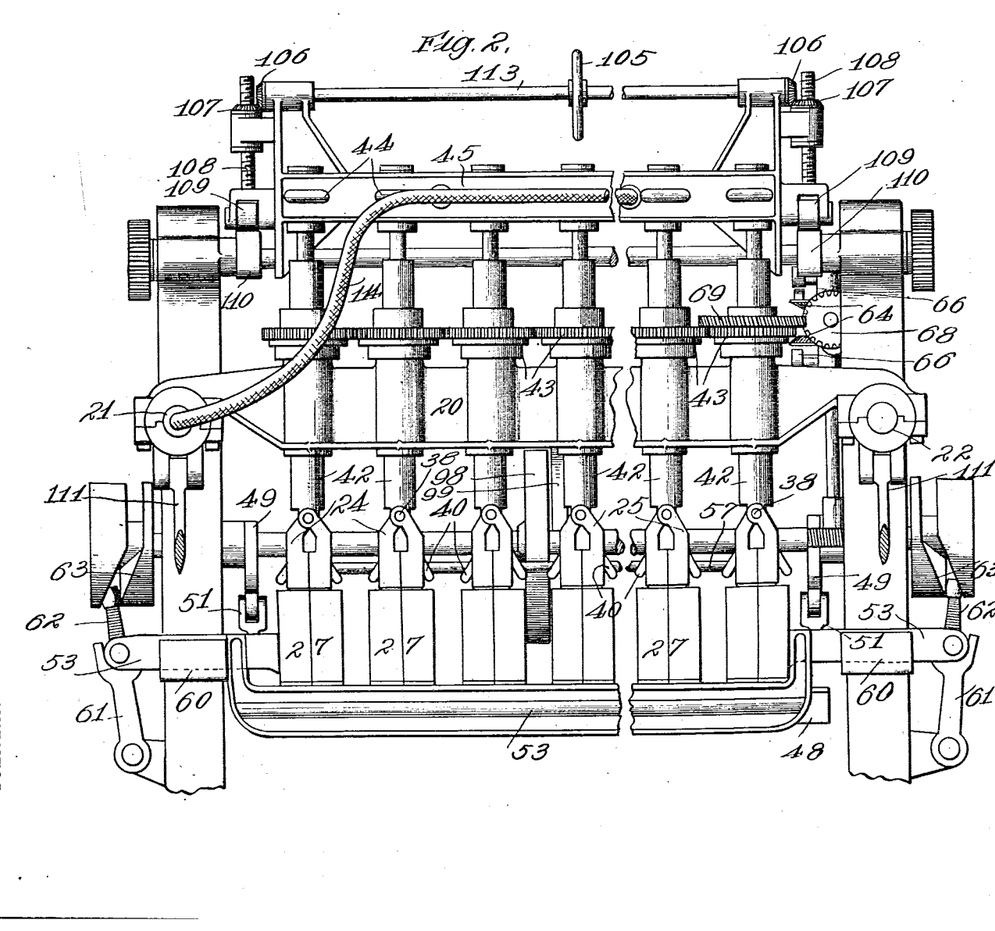
Fig. 2 a front view of Fig. 1.
Figure 3:
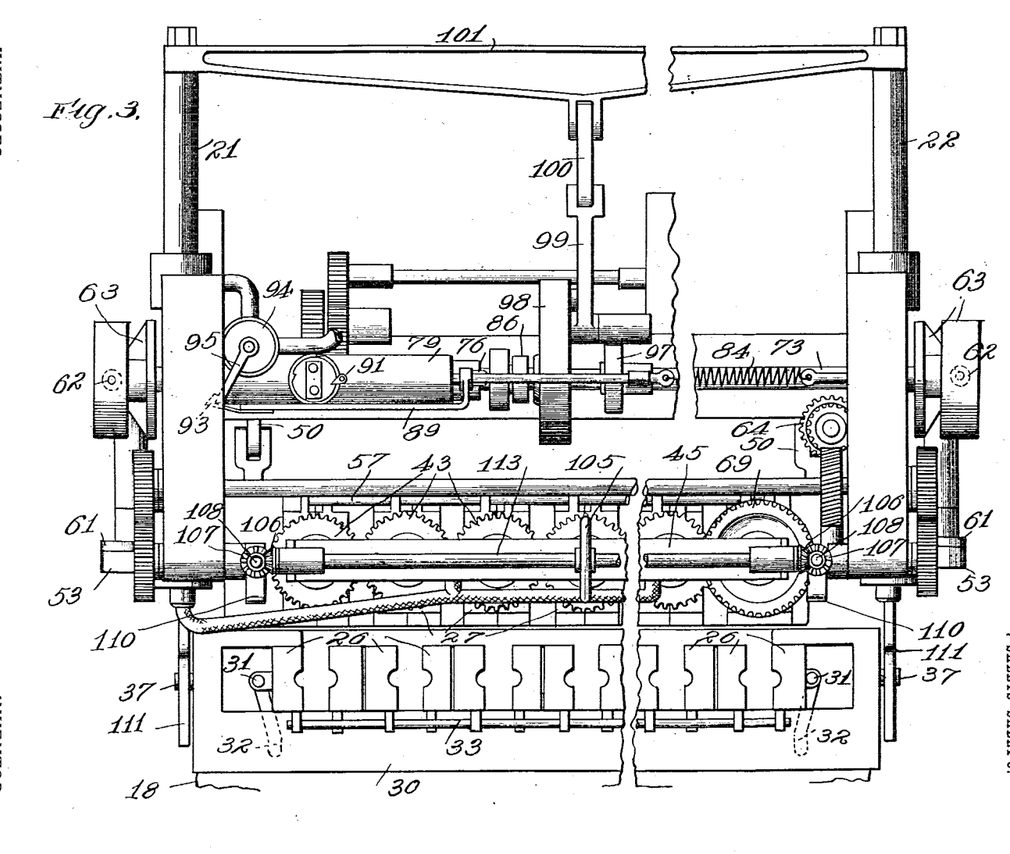
Fig. 3 a plan view of Fig. 1 seen from above.
Figure 4:
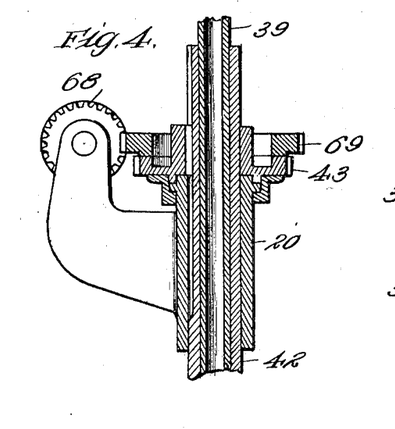
Fig. 4 a side view of part of Fig. 5, showing gears for revolving the blow heads.
Figures 8, 9:
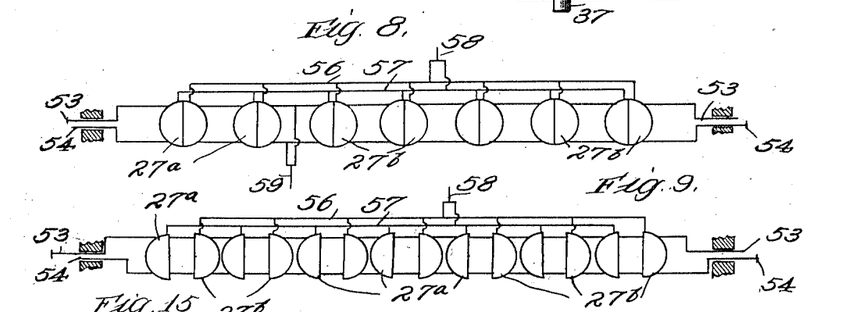
Fig. 8 a diagrammatic view of the closed finishing molds.
Fig. 9 a diagrammatic view of the open finishing molds.

In Figs. 8 and 9 is shown how the finishing molds are reciprocated. The support 54 is fastened to the bottom of one half 27$^b$ of each mold having a sliding bearing with the other half 27$^a$, and support 53 is similarly connected to the other half 27$^a$, so that by pushing the projecting parts of supports 53 and 54 at left and right side respectively of Fig. 9, where molds are shown open, the half mold 27$^a$ will slide along support 54 and half mold 27$^b$ will slide along support 53 until they meet as shown in Fig. 8. In opening the molds, the reverse is true. The fluid outlets 56 and 57 join a common outlet at 58 through a flexible connection. 59 represents an inlet which supplies supports 53 and 54 and may be placed at any convenient place, having flexible connection with the supports. The molds and supports are reciprocated by means of levers 61 and 62 and cams 63 in bearings 60 shown at the ends of the Figs. 2 and 3, and Fig. 4 shows means for revolving the blow heads 19. The gears 64 Fig. 5 are driven together and as they revolve, the cams 65 strike the stationary rollers 66 and the gears 64 are alternately raised and lowered, thus engaging the bevel wheel 67 first on one side, then the other, thus turning it one way then reversing. This motion is transmitted through the gears 68 and 69 Fig. 4 to 43, which in turn engages its neighboring gear, etc., thus driving the sleeves 42. The jaws 25 at the lower end turn the blow pipes 39 by means of the projecting parts 40 on the pipes (Fig. 5). This feature is useful in finishing the tops of bottles, thus rubbing out the fin left by the parting line of the jaws or by gripping the article and revolving it in the mold, thus rubbing out the crease left by the mold.

Figure 10:
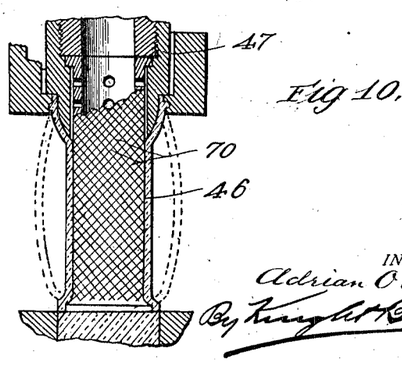
Fig. 10 a detail view of the nozzle as adapted to blow lantern globes.

Fig. 10 shows how the plug or nozzle 46 is extended for blowing a lantern globe, leaving it open at both ends, the blank being formed as shown in heavy lines and expanded to the dotted lines. The blank molds and finishing mold are of the same length in this case. The diagonal lines 70 on the nozzle 46 represent fine slits which are necessary to conduct the air when large globes are blown, but they are very fine and do not allow the glass to enter. They do not connect with the interior of the nozzle 46 except at the top. When glass is used for blowing bottles, a variety called flint glass is used which at about 2300° F. has the consistency of molasses. It is very quickly chilled and in forming the blank, the casing is chilled and this keeps the blanks from running but at the neck or where it is held it is chilled to shape. Lead glass which is used for electric light bulbs, etc., cannot be handled in an open furnace because the lead will oxidize out of the glass, but in this construction either lead or flint glass may be used. In using flint glass, it is necessary to anneal the articles after being formed in so-called leers and a provision for a leer feed is necessary. Fig. 1 shows in dotted lines the bottles dropped in a trough 29 where they are allowed to cool until the next bunch is ready to drop from the machine, when the bottom 71 of the trough 29 is pulled in the direction of the arrow, allowing the bottles to pass through.

Figures 11, 12:
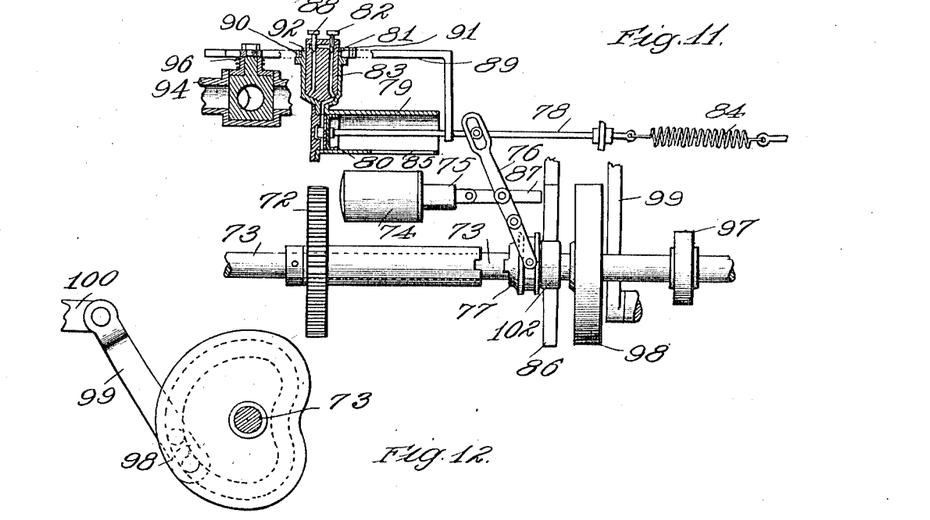
Fig. 11 an elevation, partly in section, of a clutch arrangement.
Fig. 12 an end view of a part of Fig. 11.
Figure 13:
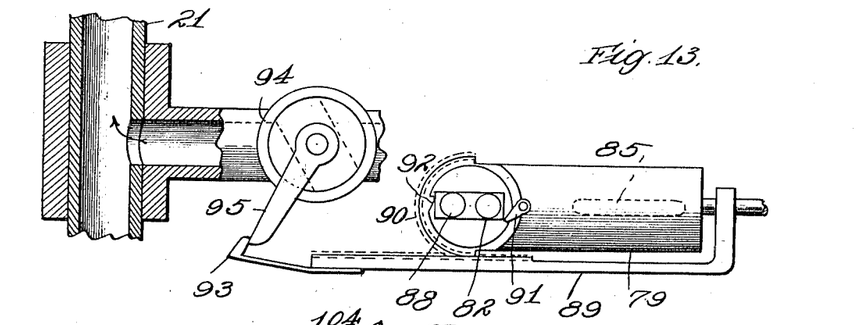
Fig. 13 a top plan view, partly in section, of a part of Fig. 11, and Fig. 14 a cross section of Fig. 11 showing arrangement of contacts.
Figure 14:
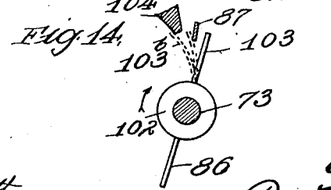
Figure 15:
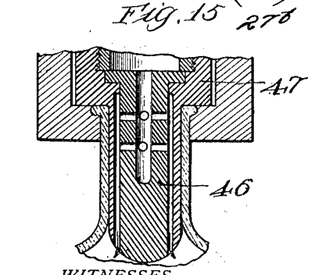
Fig. 15 is a detail view of the nozzle in larger scale.

Figs. 11 to 14 show the timing and operating mechanism which consists of a continuously revolving sleeve-gear 72 driven by a motor through a train of gears and is running free upon shaft 73. 74 is an electric solenoid, operating core 75 and acting on shifter lever 76, which throws jaw clutch 77 out of engagement with gear 72 at the same time moving the piston 78 to the position shown, which creates a vacuum in the cylinder 79 by forcing the air out around the cup leather 80. Air is then admitted through the port 81 controlled by the needle valve screw 82 in the plug valve 83 and the piston is pulled by the spring 84. When the slot 85 is reached, the piston 78 is no longer retarded and it, therefore, allows the clutch 77 to immediately engage with the gear 72. Supposing this period to be when bottles are being blown, the clutch then engages the gear 72 for one half revolution, whereupon the revolving contact 86 on shaft 73 strikes contact piece 87 on the solenoid core 75. The core is thereupon drawn back and the machine stops with the heads over the furnace openings. The setting of needle valve 88 will regulate the time necessary to fill the molds, whereupon the blanks are conducted to the finishing molds and the valve screw 82 will regulate the time for blowing. The plug 83 is seated on its bevel end in the casing and is revolved in one direction by the rack 89, the gear 90, the pawl 91 and the two toothed ratchet 92. The gear 90 is supplied with teeth on a little over half its circumference and the pawl 91 is attached on this gear which revolves free about the casing of the plug valve 83. The ratchet 92 is attached to the valve 83 and has but two teeth cut diametrically opposite, thus insuring proper alinement of ports for each stroke of the solenoid. On the end of rack 89 is a spring pawl 93 which operates the air regulator 94 by means of the lever 95, which returns automatically in closed position by means of coil spring 96. This regulator has to regulate the period of air flow and although it works every stroke, the guide rod 21, Figs. 1, 2 and 3, shuts off the air when in position with the heads over the furnace opening. On the driving shaft 73 (Fig. 11) is a band brake 97 situated, which insures quick stoppage and a positive means for holding all moving parts on the machine in position when the clutch 77 is out of engagement. Fig. 12 shows a cam 98 which operates a lever 99 and through connecting rod 100 reciprocates the yoke 101, which connects the guides 21 and 22, Figs. 1, 2 and 3. In Fig. 14 is illustrated a method of making the solenoid contact. The disk 102 is keyed on shaft 73 and holds the flexible contacts 86 and 103, which, as they revolve, strike an interrupter 104, causing them to spring back as shown in dotted lines at 103$^b$. Upon slipping off to strike the solenoid, contact 87, the latter draws away and allows the contact to assume the position shown in full lines at 103, missing the contact 87 upon the return stroke allowed by the vacuum piston 78.

The heads are adjustable through a hand wheel 105, a shaft 113, bevel gears 106 and nuts 107 and screws 108 (Fig. 2), which latter have sliding heads containing pin and roller 109. The heads are operated by cams 110 driven by gearing from shaft 73 as shown.

The levers 111 are provided with stops 112 which leave them in vertical position when picking up blanking molds, thus centering the heads over the molds (see dotted lines showing heads over furnace opening, Fig. 1). These levers 111 are open at the ends to allow the backing away of the machine from the furnace.

When making small articles, the fluid spaces for cooling molds are not necessary, but for large articles it is advisable on both blanking and finishing molds. The blanking molds are then connected with four hollow rods all on the same side of the molds as rods 33 and 34 (Fig. 6), which serve both for reciprocating the molds and conducting the fluid. The largest articles are made by using only alternate heads.

I claim:—

1. In a glass shaping machine, a battery of blanking molds in a straight row, independent means for charging each of said blanking molds, a battery of finishing molds arranged on the same level with and in a line parallel to said blanking molds and each finishing mold opposed to one of the blanking molds, each mold being divided upon a vertical plane passing centrally through it and the opposite mold, means for opening and closing said molds, a battery of a like number of blowing members, horizontally movable in a group, from the blanking molds to the finishing molds while retained in upright position, a battery of heads, movable with the blowing-members each head serving in common for a blanking mold and its corresponding finishing mold, and each head being adapted to carry a charge of glass from a blanking mold to the corresponding finishing mold, means to move said blowing members and heads in straight horizontal lines from the blanking to the blowing molds, and means for delivering pressure medium through said blowing members while the heads are on the finishing molds.

2. In a glass shaping machine, a battery of blanking molds in a straight row, independent means for charging each of said blanking molds, a battery of finishing molds arranged on the same level with and in a line parallel to said blanking molds and each finishing mold opposed to one of the blanking molds, each mold being divided upon a vertical plane passing centrally through it and the opposite mold, means for opening and closing said molds, a battery of a like number of blowing members, movable in a group, from the blanking molds to the finishing molds, a battery of heads, movable with the blowing-members in a horizontal direction, each head serving in common for a blanking mold and its corresponding finishing mold, and each head being adapted to carry a charge of glass from a blanking mold to the corresponding finishing mold, means to move said blowing members and heads in straight horizontal lines from the blanking to the blowing molds, and means for delivering pressure medium through said blowing members while the heads are on the finishing molds; all of said blanking molds being simultaneously movable with the heads and blowing members, during the first part of their travel toward the finishing molds said blanking molds being open during such simultaneous movement.

3. In a glass shaping machine, a battery of blanking molds in a straight row, independent means for charging each of said blanking molds, a battery of finishing molds arranged in a line parallel to said blanking molds and each finishing mold opposed to one of the blanking molds, each mold being divided upon a vertical plane passing centrally through it and the opposite mold, means for opening and closing said molds, a battery of a like number of blowing members, movable in a group, from the blanking molds to the finishing molds, a battery of heads, movable with the blowing-members in a horizontal direction each head serving in common for a blanking mold and its corresponding finishing mold, and each head being adapted to carry a charge of glass from a blanking mold to the corresponding finishing mold, means to move said blowing members and heads in straight horizontal lines from the blanking to the blowing molds, and means for delivering pressure medium through said blowing members while the heads are on the finishing molds; a common carrying plate for all of said blanking molds making them simultaneously movable with the heads and blowing members, during the first part of their travel toward the finishing molds, said blanking molds being opened during such simultaneous movement and said plate being adapted to close the charging means by such movement.

4. In a glass shaping machine, a battery of blanking molds in alinement, independent means for charging each of said blanking molds, a battery of finishing molds arranged in a line parallel to said blanking molds and each finishing mold opposed to one of the blanking molds, a battery of a like number of blowing members, movable in a group, from the blanking molds to the finishing molds, a battery of heads, moving with the blowing-members each head serving in common for a blanking mold and its corresponding finishing mold, and each head being adapted to carry a charge of glass from a blanking mold to the corresponding finishing mold, and means for delivering pressure medium through said blowing members while the heads are on the finishing molds; all of said blanking molds being simultaneously movable with the heads and blowing members, during a part of their travel toward the finishing molds, and having means automatically opening all of the blanking molds by said accompanying movement.

5. In a glass shaping machine, a battery of blanking molds in a straight row, independent means for charging each of said blanking molds, a battery of finishing molds arranged on the same level and in a line parallel to said blanking molds and each finishing mold opposed to one of the blanking molds, each mold being divided upon a vertical plane passing centrally through it and the opposite mold, means for opening and closing said molds, a battery of a like number of blowing members horizontally movable in a group, from the blanking molds to the finishing molds, a battery of heads, movable with the blowing members each head serving in common for a blanking mold and its corresponding finishing mold, and each head being adapted to carry a charge of glass from a blanking mold to the corresponding finishing mold, means to move said blowing members and heads in straight horizontal lines from the blanking to the blowing molds, and means for delivering pressure medium through said blowing members while the heads are on the finishing molds; all of said blanking molds while remaining in upright position being simultaneously movable with the heads and blowing members in horizontal direction, during the first part of their travel toward the finishing molds; said blanking molds being opened during such simultaneous movement, the individual blowing members having simultaneous rotary movement and axial reciprocating movement relative to the respective finishing molds in addition to their traveling movement between the molds; a mounting being provided for said blowing members by which they are carried between the molds, and said blowing members being provided with rotating gears mounted upon and carried with them, and driving connections carried in part upon the mounting for said blowing members, and partly upon a fixed portion of the machine; said driving connections being brought into coöperation by the travel of the blowing members toward the finishing molds.

6. In a glass shaping machine, a pair of molds, comprising a blanking mold and a finishing mold on the same level and having a common head, said blanking mold having a stationary bottom and a horizontally slidable body maintained in upright position, said body being divided on its central vertical plane into two members, each movable away from the other, said vertical plane passing centrally through both molds constituting one pair; said bottom having an aperture for charging said body with molten glass and a plate for covering said aperture, while said blanking mold is being opened, said plate being slidable together with said body in the direction of the finishing mold.

7. In a glass shaping machine, a pair of molds, comprising a blanking mold and a finishing mold on the same level and having a common head, said blanking mold having a stationary bottom and a horizontally slidable body maintained in upright position, said body being divided on its central vertical plane into two members, each movable away from the other, said vertical plane passing centrally through both molds constituting one pair, said bottom having an aperture for charging said body with molten glass and a plate for covering said aperture, while said blanking mold is being opened, said plate being slidable together with said body in the direction of the finishing mold and having an opening in which said body is seated, said opening permitting transverse movement of said body members in a direction transversely to the movement of said plate.

8. In a glass shaping machine, a pair of molds, comprising a blanking mold and a finishing mold on the same level, said blanking mold having a stationary bottom apertured for the entrance of molten glass and a slidable body, the bodies of the molds being divided on the vertical plane passing centrally through the two molds, a common head for the molds adapted to carry a blank from the blanking to the finishing mold, means for moving the common head in a straight horizontal line from the blanking to the finishing mold, means to cause said slidable body to move with the head in the first part of its travel toward the finishing mold, means to open said body during such movement, and a plate extending from the side of said slidable body away from the finishing mold connected to the slidable body so as to move therewith toward and from the finishing mold without interfering with the opening and closing of said slidable body, said plate covering the aperture in said stationary bottom when the slidable body is slid from over said aperture.

9. In a glass shaping machine, a plurality of pairs of molds, each comprising a blanking mold and a finishing mold having a common head, said blanking mold having a body divided on its central vertical plane, a common stationary bottom for all of said blanking molds, said bottom having an aperture for each body for the purpose of charging said body with molten glass, a plate covering said apertures, while said blanking molds are being opened, said plate being slidable together with said bodies in the direction of the finishing molds and having openings for each of said bodies and in which they are seated, said openings permitting transverse movement apart of said body members in a direction transversely to the movement of said plate, and means for moving said body members apart, said means comprising connections between all the right hand body members and other connections between all the left hand body members, and an arm on each of the extreme right and left hand members and diverging grooves in said bottom in engagement with said arms, a plurality of blowing members, one for each finishing mold, one of said heads suspended from each of said blowing members, said blowing members being simultaneously displaceable from the bodies of said blanking molds to the bodies of said finishing molds; said blowing members being provided with levers engaging with said plate for displacing the plate, closing said apertures and opening said blanking mold bodies.

10. In a glass shaping machine, a plurality of pairs of molds, each pair comprising a blanking mold and a finishing mold, all the blanking molds being situated in one straight row and the finishing molds in another straight row parallel to the first row and on the same level, the connecting center line of each pair being perpendicular to said rows; a common head for each pair of molds, and means for shifting said head horizontally while in upright position between the molds in each pair.

The foregoing specification signed at Toledo, Ohio, this eighth day of April, 1912.

ADRIAN O. ABBOTT, Jr.

In presence of—
R. M. Tubbs,
I. L. Phelps.